United States Patent [19]

Sommer

[11] 4,102,326
[45] Jul. 25, 1978

[54] CENTRAL RECEIVER SOLAR COLLECTOR USING MECHANICALLY LINKED MIRRORS

[76] Inventor: Warren T. Sommer, 2608 N. Humboldt Blvd., Milwaukee, Wis. 53212

[21] Appl. No.: 837,181

[22] Filed: Sep. 28, 1977

[51] Int. Cl.² ............................................. F24J 3/02
[52] U.S. Cl. .................................. 126/270; 126/271; 350/299
[58] Field of Search ................. 126/270, 271; 350/299; 237/1 A

[56] References Cited

U.S. PATENT DOCUMENTS

| 3,466,119 | 9/1939 | Francia | 350/299 |
| 3,861,379 | 1/1975 | Anderson, Jr. | 126/271 |
| 3,924,604 | 12/1975 | Anderson | 126/271 |
| 4,034,735 | 7/1977 | Waldrip | 126/271 |
| 4,034,737 | 7/1977 | Kume | 126/271 |

*Primary Examiner*—Kenneth W. Sprague

[57] ABSTRACT

A solar collector having a central radiation receiver and a field of mirrors which are mechanically linked to track the sun and reflect solar radiation onto the radiation receiver. A rigid mechanical controlling element is carried by a plurality of parallel arms which are continuously aligned in the direction of the sun. Each mirror is coupled at normal incidence to a linear guide member which engages one of a plurality of positional guides mounted on the rigid controlling element to keep the mirrors in proper alignment.

19 Claims, 19 Drawing Figures

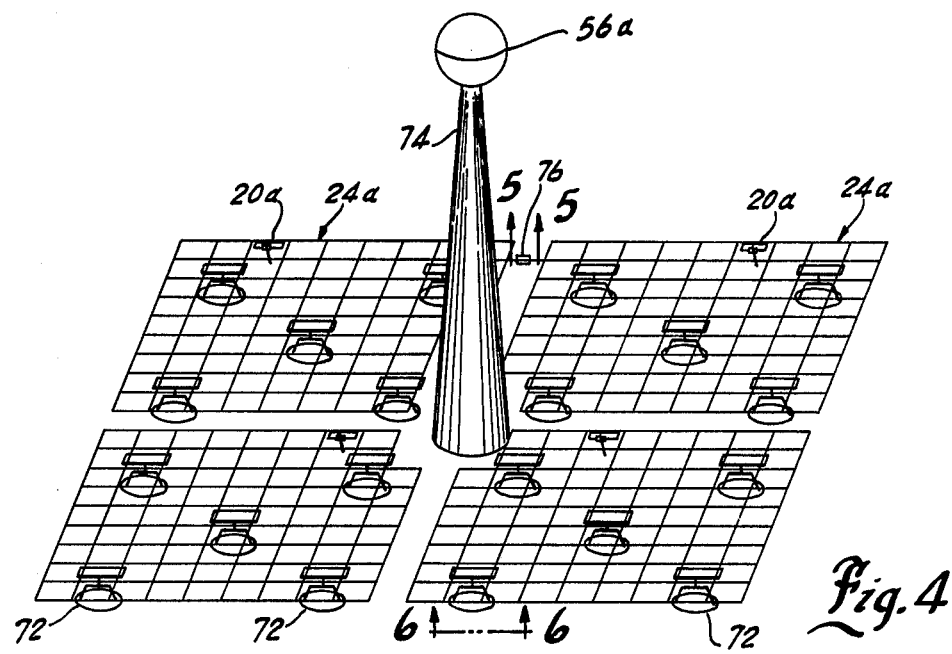
Fig.4
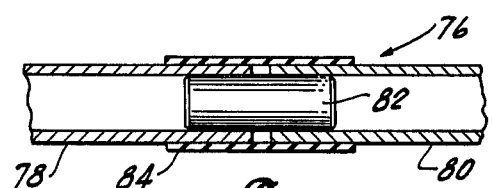
Fig.5
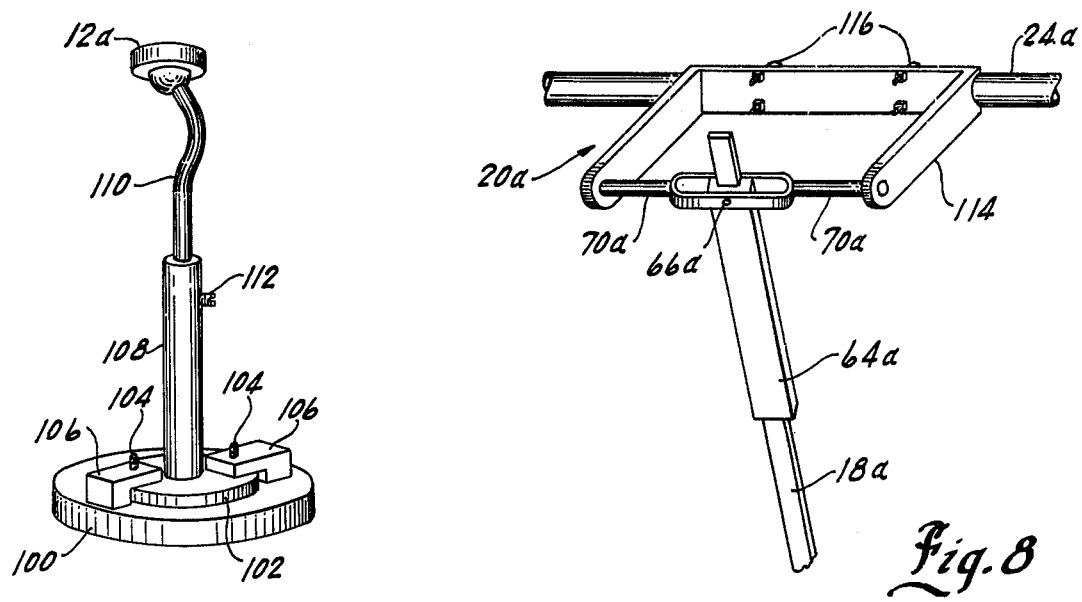
Fig.7
Fig.8

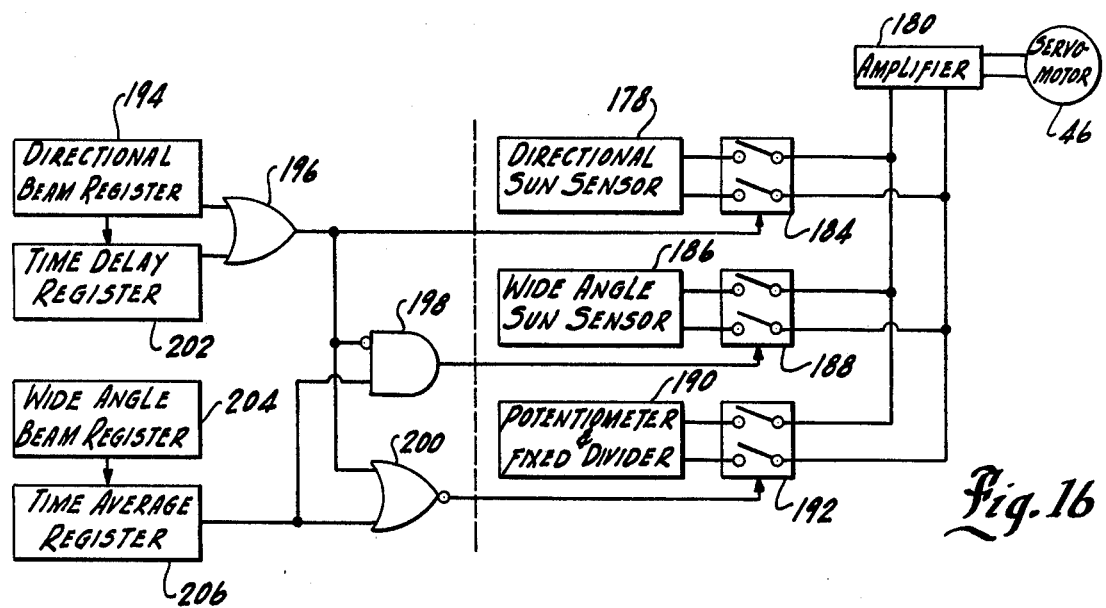
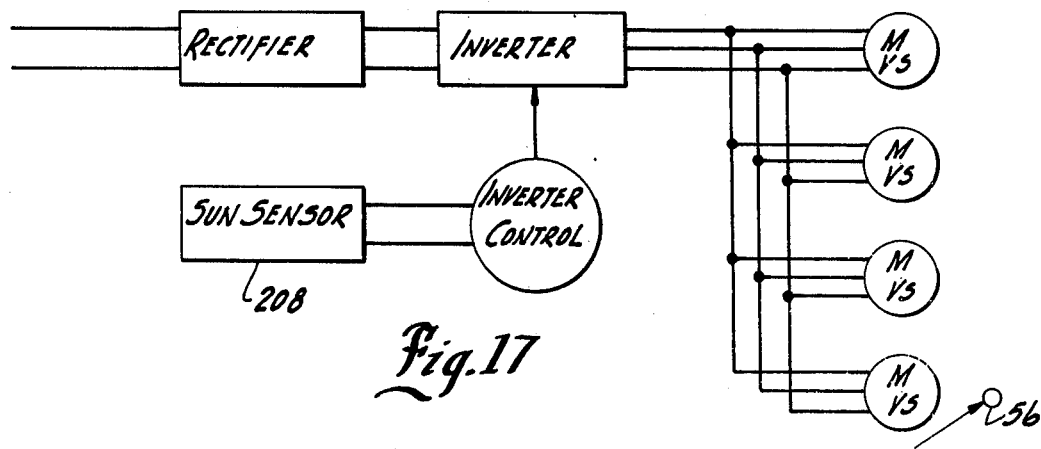
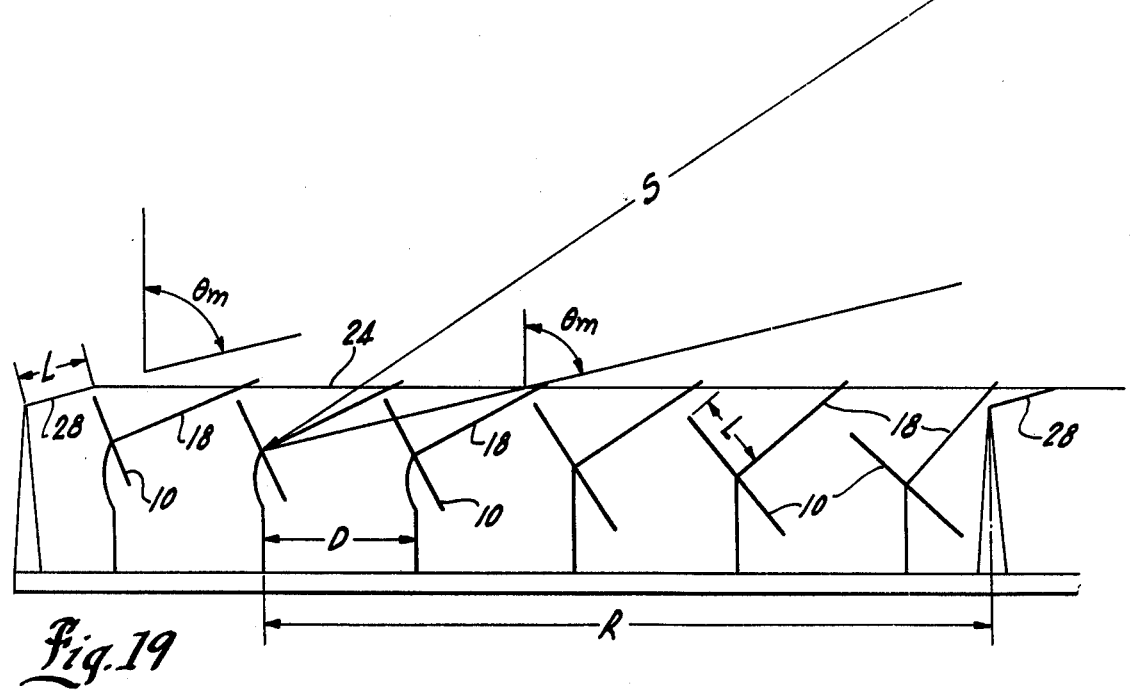

CENTRAL RECEIVER SOLAR COLLECTOR USING MECHANICALLY LINKED MIRRORS

BACKGROUND OF THE INVENTION

This invention relates to means for concentrating solar radiation by use of a plurality of collectively controlled mirrors.

For many desired applications of solar energy, it is highly desirable, and in some cases it is essential, that the beam component of solar radiation be concentrated to flux levels many times greater than the ambient value. The need for an economical means of providing highly concentrated solar radiation is present both for small scale and large scale applications. For example, the use of solar energy for air conditioning, either by conversion of thermal energy to mechanical energy which is used to power the air conditioner, or by absorption cooling, requires the higher temperatures available from concentrating type collectors to achieve good efficiency. The present extremely high cost of photoelectric cells for direct conversion of solar to electrical energy can be counteracted by the use of sufficiently high flux concentration coupled with rapid heat removal from the photo cell. Effective thermal energy storage can best be accomplished at the higher temperatures available from concentrating collectors. More sophisticated storage methods, such as the reversible thermochemical conversion of alkaline earth hydroxides to oxides, as described in U.S. Pat. Nos. 3,973,552 and 3,955,554, are dependent on the availability of collectors providing high flux concentration. The feasibility of large scale thermal conversion solar power plants likewise depends on the development of economical collectors which provide high flux concentration.

A large number of types of concentrating collectors are known. One of the most comprehensive inventories of the known types is the book Applied Solar Energy: An Introduction by A. B. Meinel and M. P. Meinel, (Addison-Wesley, New York, 1976). Despite the large number of available types of concentrating collectors, it is not yet clear that any of these can be manufactured at a cost which will allow solar energy to make a major contribution for applications requiring substantial flux concentration.

One of the most obvious types of concentrating collector is simply a combination of a parabolic mirror with an appropriate radiation absorbing receiver placed at the focus. A tracking mechanism such as that described in U.S. Pat. No. 3,305,686, which is hereby incorporated for reference, allows the collector to follow the sun. A primary difficulty with collectors of this type is that the tracking mechanism is too complex and expensive to be practical for small collectors; while the structural requirements for maintaining the parabolic mirror shape cause the cost to rise much faster, as the collector size is increased, than does the area of the collector, so large collectors are also impractical.

One of the concentrating collector concepts which is currently receiving a good deal of attention is the possible large scale application in which a radiation receiver is placed on a high tower and furnished with concentrated solar radiation by a large number of independently guided mirrors mounted near ground level. Among the advantages of this system is the fact that a great deal of solar energy is collected for use at the single central power plant without the requirement for transporting fluid at very high temperatures over large distances as is required in some of the alternative large scale power plant proposals. The tracking accuracy requirements for each mirror are even more formidable than the accuracy requirements for an independent parabolic collector. However, the scale of the collector is to be so large that the individual mirrors may be generally plane surfaced mirrors rather than parabolic (although the use of multiple faceted mirrors may be desirable), thus allowing more economical mirrors to be used than in alternative collector concepts.

Because of the current interest in the type of large scale collector concept described above, a number of articles have recently appeared dealing with the technical details of specific embodiments of this type of collector. For example, in the first two issues of Volume 19 of the journal Solar Energy may be found articles dealing with: optimum mirror deployment, mirror aiming strategy, optimum receiver design, and the expected performance of metallized plastic film mirrors when used with central tower solar collectors. These detailed topics are all of interest relative to the invention to be described. However, of more specific interest is the article "Solar Thermal Power System Based On Optical Transmission" by L. L. Vant-Hull and A. F. Hildebrand, Solar Energy 18, 31–39(1976). This article presents a summary of a rather detailed technical and economic evaluation of the major components making up a full size solar power plant. A notable conclusion of this study is that despite the apparent technical difficulty of locating a major part of a power plant at the top of a tower which, according to this study, would be among the tallest man-made structures in the world, the cost of the tower and receiver are found to be only a "minor cost component". The dominating cost of the collector is in the field of heliostats, and if there are to be any cost reductions sufficient to substantially increase the practicality of large scale solar power, the cost reduction will have to come in the overall cost per unit area of mirror in the heliostat field.

In the study cited above, a number of types of mounting systems were considered. An elevation-azimuth mount was found to be most desirable. The guidance system selected was a combination of course control by a central computer and fine control by an individual optical sensor associated with each mirror. Local minicomputers are required to coordinate the guidance systems. Tracking accuracy is to be within one milliradian. Various mirror systems were also considered, with the final choice being a steel backed 20 ft. glass mirror. The overall heliostat costs broke down roughly as one fourth for electronics and computer, one fourth for actuators, and the remaining one half for mirror structure and pedestal. The cost per unit area of the final heliostat package was calculated as roughly 20 times as great as the cost per unit area of an unmounted glass mirror of the quality used in the heliostat.

It will be realized that the heliostat component costs are an interrelated package. The amount of structural material incorporated into the mirror backing and the pedestal may be expected to scale roughly as the cube of the linear dimensions of the mirror. Thus, from the standpoint of amount of structural material required per unit area of mirror, it would appear desirable to decrease the size of the mirrors. However, if smaller mirrors were used, the cost per unit area for the guidance components would become excessive. Conversely if the cost per heliostat for the guidance components were to be altered significantly, it would be appropriate to reevaluate both the optimum size and the cost for the mirror and pedestal components.

It will be seen that the features which make the multi heliostat central receiver collector the most promising candidate for large scale power plants also would in many cases be desirable for small and moderate sized collectors. However, it is clear that it would not be practical to control the individual mirrors of a small system with the same type of independent controls as have been proposed for the large scale system. Only the development of an appropriate system for mechanically linking the mirrors will make the multimirrored system with central receiver practical on a small scale.

Linked mirror systems providing concentration in two dimensions are known and may be found described, for example, in U.S. Pat. No. 3,861,379. However, two dimensional concentrators do not provide sufficiently high concentration ratios for many desired applications such as high temperature thermochemical energy storage, efficient conversion of solar energy to mechanical energy, or economical direct conversion of solar energy to electrical energy using a small area of photocell exposed to high flux. Additionally, collectors using two dimensional concentration tend to lose a significant amount of radiation out the end of the collector unless they are made quite long relative to their other dimensions.

U.S. Pat. No. 3,466,119 described a linked mirror collector providing three dimensional concentration, which is based on a special type of linkage incorporated into an equatorial mount. However, the basic linkage only allows collective control of the mirrors corresponding to changes in the hour angle of the sun. The patent describes an additional feature which is an intermittently operated mechanism designed to vary the orientation of the mirrors corresponding to changes in the declination of the sun. However, of the collectors of this type which have been constructed, apparently none have incorporated the declination adjustment feature. The declination of the mirrors on existing collectors of this type must currently be adjusted individually by hand on a periodic basis. It appears unlikely that use of the intermittent mechanism described in the patent would completely eliminate the need for periodic manual adjustment. The collectors of this type which have been constructed have been used as research instruments, so the requirement for frequent attention and adjustment has been acceptable. However, for routine use, the lack of declination control would not be tolerable.

Basis of the Invention

The invention to be described here is based on an analysis of mirror angles, using angular coordinates which are different than the coordinates which are naturally associated with any of the conventional types of mirror mounts. As the resulting equations have not been found in any published paper in the solar energy literature, the coordinates used may also be different than those used for analysis by any of the persons who have published technical papers dealing with the multimirror central receiver type of collector. Inspection of the equations resulting from the use of these coordinates reveals that there are at least two fundamentally different types of systems in which a plurality of mirrors may be collectively controlled to direct radiation from the sun, or any other distant radiation source, onto a fixed central receiver.

One of these systems is a collector in which the mirrors are mechanically linked by a rigid controlling element. The system should be useful for collectors from very small size up to fairly substantial installations. Because of limitations on mechanical components, it would not be expected that the rigidly linked system would be readily adaptable to extremely large scale applications. The conceptual basis for this collector could equally well have been the same geometric construct as that which served as the basis for the system described in U.S. Patent 3,466,119. However, the physical embodiments of the present invention, and the degree of collective mirror control which is possible with these embodiments, is quite different than for the system described in that patent.

The second type of system utilizes non-rigid coupling means in a collective control system. Several different coupling mechanisms are possible and some of these appear to be applicable to very large scale collector systems.

SUMMARY OF THE INVENTION

This invention is a solar collector in which a plurality of mirrors are controlled by a rigid mechanical linkage so that all the mirrors reflect solar radiation onto a radiation receiver whose dimensions are small compared to the dimensions of the mirror field. Each mirror is mounted on a mirror mount, which is simply some type of supporting structure plus an articulated joint which allows the mirror to move freely through a wide range of angular positions. The mirror mounts are to be maintained in fixed spatial relationship to one another, and generally also in fixed spatial relationship to the radiation receiver. To maintain the fixed spatial relationship among the mounts, they should be incorporated into a first rigid structure, which in some cases would be a specifically manufactured component of the collector, but which in other cases may simply be the portion of the earth's surface over which the mirror array is deployed, or some pre-existing structure such as the roof of a building. Associated with each mirror is a linear guide rod, or guide member, which lies along a line extending through the center of rotation of the articulated joint of the mirror mount and which is adapted to maintain the plane of the mirror at normal incidence to itself. In order to orient the plurality of guide members and hence the plurality of mirrors, there are a plurality of positional guides, each of which slidably engages an individual linear guide member and establishes a second point through which the line of the linear guide member must pass in addition to the center of rotation of the associated articulated mirror mount joint. All the positional guides are to be maintained in fixed spatial relationship to one another and are to be translatably moved in unison relative to the mirror mounts in order to maintain the individual mirrors in proper orientation as the angular position of the sun changes. In order to maintain the fixed spatial relationship among the positional guides, the guides should be incorporated into a second rigid structure which may be translatably moved in three mutually orthogonal directions with respect to the first rigid structure.

The motion of the second rigid structure is to be such that each positional guide is constrained to move over a spherical surface, with the spherical surfaces having no physical embodiment but simply defining the possible positions of the individual positional guides. The spherical surface over which each positional guide moves is particular to that individual positional guide, with the spherical surfaces defining the possible positions of the individual positional guides being all of the same size. For any given angular position of the sun, the second rigid structure is to be moved to a position such that each positional guide lies along a sun ray which passes through the center of the sphere of constraint for that positional guide. Practical mechanical considerations will dictate that each positional guide will actually be constrained to move within one hemisphere of its spherical surface of constraint, and usually somewhat less than a complete hemisphere.

For the systems illustrated in the drawing, the constraint on the motion of the second rigid structure is a physical constraint associated with the fact that the second rigid structure is carried by a plurality of equal length parallel arms, each rotatable about a point fixed with respect to the first rigid structure. In order to satisfy the requirement that each positional guide lies along a sun ray which passes through the center of the sphere of constraint for that positional guide, it is necessary only that the parallel arms carrying the second rigid structure be aligned parallel to the direction of incoming sunlight. The type of control system used to align the arms is relatively straight-forward and well-known. Other means for moving the second rigid structure could also be used. In particular, separate pluralities of linear actuators acting in three mutually orthogonal directions could be used. However, the actuators would all have to make a rolling or sliding engagement at one end and the control system would be considerably more complex than is the case when parallel arms are used. This alternative system is therefore not shown in the drawing; even though it might have merit for large systems where vertical actuators may be somewhat better adapted than parallel arms to carrying a heavy rigid structure.

The center of rotation of a mirror mount associated with a particular positional guide is to be located on the same spherical surface of constraint which defines the possible positions of the positional guide. The mirror mount joint is to be positioned on the spherical surface at a point where a straight line which passes through the center of the sphere and also through an aiming point in space, which defines the proper position for the radiation receiver, intersects the spherical surface. The mirror mount joint is to lie in the opposite hemisphere of the spherical surface than that in which the positional guide is constrained to move. While it will be assumed here that it will be desired to use a single aiming point in order to direct the sunlight toward the smallest possible receiver consistent with the mirror size, aiming accuracy, and angular width of the sun; it may be noted that it would be possible to use different aiming points for different mirrors if desired.

While in principle, great flexibility could be allowed in the arrangement of either the mirror mount joints or the positional guides, so long as the position of the complementary components were chosen to satisfy the relationship described above; practical considerations will usually dictate certain restrictions on the arrangement of these components. It is conceptually helpful in understanding the collector if the plurality of mirror mount joints are distributed over a generally smooth first surface of revolution with the axis of revolution passing through the aiming point which defines the position of the radiation receiver. In that case, the positional guides will be distributed over a generally smooth second surface of revolution having an axis of revolution which is parallel to the axis of revolution for the first surface of revolution and coincides with the axis of revolution for the first surface of revolution when the second rigid structure is moved to a position appropriate for focusing radiation from a distant source lying along the coincident axes, i.e. when the parallel arms carrying the second rigid structure are made parallel to the axes of revolution. The spacing between the first and second surfaces of revolution will vary over the collector, with the maximum spacing occurring at the position of the axes of revolution. A preferable form for one of the surfaces of revolution will typically be a plane surface. Although an axis of revolution for a plane surface is usually undefined, the plane surface shall here be considered to be the limiting case of a non-plane surface of revolution which has a defined axis of revolution which may be associated with the plane surface. When one of the surfaces of revolution is a plane surface, the components distributed over that surface will normally be distributed in a regular lattice pattern. Further consideration of the relationship between the mirror mount joints and positional guides will be made by means of equations developed with reference to one of the figures of the drawing.

Three substantially different means of carrying the mirrors have been considered. The most straight-forward of these is to mount the mirrors on posts which are fixed to the first rigid structure. This structural form is well suited to situations in which there is available a pre-existing structure which may adequately serve as a rigid structure to which the posts may be fixed, or at least as a foundation for a manufactured first rigid structure. Achieving the appropriate spacing between mirror mount joints and positional guides for this type of system will normally be accomplished by choosing an appropriate length and position for each post, with the positional guides arranged in some regular pattern based on a lattice structure which carries them. The preferred mirror mount joints are ball and socket joints, although other types of joints could be used, and a simple flexible connection between post and mirror would be appropriate for some simple systems.

A second means of carrying the mirrors is adapted to situations in which the concentrator portion of the collector is to be suspended, in order that the land below retain a function other than solar energy collection. An example of such a situation might occur if it were desired to suspend the concentrator over a parking lot, while mounting the radiation receiver on a nearby building. In this embodiment of the invention, the first rigid structure is comprised of a rectangular lattice formed of relatively thin structural members. The lattice would be supported by suspension cables fixed to poles extending above the lattice. As the degree of rigidity required of the lattice is less if the mirrors are mounted in the plane of the lattice rather than on posts extending from the lattice, no mounting posts are used in this form of the invention. The mirror mount joints are comprised of a form of ball and socket joint, with the balls centered at the points of intersection of the linear structural members making up the lattice. The sockets are to be segmented, with four narrow segments adapted to grip a ball while avoiding interference with the linear structural members forming the lattice. The mirrors are also be be segmented, with each segment preferably formed of a metallized plastic film stretched over a two dimensional frame which is fixed to a segment of the socket. In order that the gaps between mirror segments maintain the proper alignment with the linear structural members making up the lattice, it is necessary that each combination of positional guide and linear guide member act as an angular coupling which defines a proper rotational position of the mirror about the linear guide member, as well as acting to define the proper pointing direction for the mirror.

A third means of carrying the mirrors is adapted to the use of very small mirrors. This form of the collector may be desirable if a low profile concentrator is desired. Another application would be for collectors used for display or educational purposes as a large number of mirrors may be incorporated into a small collector. In this form of the collector, the functions of a mounting post and of a linear guide member are combined in a single element which, because of its small size, will be called a pin. The desired surfaces of revolution over which the positional guides and articulated mirror mount joints are to be distributed are physically embodied in this form of the invention in the form of sheets of thin durable material such as Mylar film, or possibly a fabric, formed to proper shapes over upper and lower shaping frameworks. Small holes are placed in the shaped sheets of material at points obeying the proper positional relationships so that the holes in one sheet of material may be considered positional guide positions, with the holes in the other sheet of material corresponding to mirror mount positions. The pins are to be inserted through appropriate pairs of holes in the two surfaces. Each pin is formed with a thickened region along its length which serves as a stop to limit the extent of passage of the pins through the holes, and to allow the pins to be supported by the upper surface, with a fraction of the pin length extending above the upper surface. The small mirrors are to be fixed to the ends of the pins which extend above the upper surface, with the diameter of a mirror being roughly equal to the length of pin extending above the upper surface.

Aside from the differences in the means of carrying the mirrors, there may be substantial differences in the embodiments of the invention based on the scale on which they are to be constructed. The structure of a small collector will generally be adapted to allowing a single pair of servomotors or actuators to control the motion of the second rigid structure. This may be accomplished by such means as linking the parallel arms which carry the second rigid structure by rotatable shafts, and by providing a rigid peripheral frame for the second rigid structure. On the other hand, a large collector will generally require many actuators to provide the motional means for the second rigid structure. These will generally be independently mounted but centrally controlled. As a substantial source of alignment error may be produced by the relative thermal expansion of the rigid structures in changing ambient temperatures, the second rigid structure of a large system may be constructed in segmented form, with each segment having its own motional means, in order to limit the thermal expansion effects.

Certain characteristics of the collector are dictated by the need to avoid mechanical interferences both between components and internally to individual components. If the rim angle of the collector is to be greater than about 45°, it becomes desirable that the mirrors at greater distances from the radiation receiver be made smaller than the nearer mirrors, in order to avoid interferences between the mirrors and other components. In order to reduce the chance of interferences internal to ball and socket mirror mount joints, it is desirable that joints in the peripheral areas of the collector be mounted on the mounting posts in a tilted position, with the direction of tilt generally being toward the radiation receiver. In addition to these provisions, it will normally be required that no attempt be made to track the sun when it is beyond an angle of 75° or 80° with respect to the axis of the collector.

A notable shortcoming of concentrating solar collectors has been their lack of ability to utilize available diffuse radiation during overcast periods, which in some geographic areas is a rather serious failing for a collector having a space heating function. However, a multimirror collector constructed with a southward tilt and having a transparent protective covering could fairly readily be designed to convert to a rudimentary flat plate collector during overcast periods. Essential additions to the collector would be a broad area radiation absorber, located on the other side of the mirrors from the radiation receiver, and a means for transporting heat from the broad area absorber to a use region. It would further be desired that the mirrors be tilted at a large angle to the plane of the collector, and that both surfaces of each mirror be made reflective so that as little radiation as possible would be absorbed prior to striking the broad area absorber. As all the mirrors cannot be simultaneously tilted at a large angle so long as they are rigidly linked in the concentrating mode, optimum utilization of the flat plate capability of the collector would require the disruption of some or all of the normal positional relationships between the mirror mount joints and positional guides. One means of accomplishing this, for collectors having the second rigid structure above the first rigid structure, would be to construct the second rigid structure as a plurality of narrow sections, each extending the length of the collector, with the ends of the sections slidably engaging a peripheral frame. When the sections are compacted in a close spaced condition, the positional guides would be spaced appropriately for the concentrating mode of the collector. When the sections are separated slightly so that the average spacing between positional guides, in the direction of variable section spacing, becomes generally equal to the average spacing of the mirror mount joints, all the mirrors may be tilted at roughly equal angles of about 60° to the plane of the collector.

The radiation receiver portion of the invention may differ markedly for different collectors, depending on the use to which the collected energy is to be applied, the size of the collector, the aiming accuracy of the concentrator portion, and the nature of the ancillary equipment used for handling the collected energy. It has been assumed that the mirrors used would be plane mirrors, which would require that the radiation receiver should be at least as large as the individual mirrors. When manufacturing tolerances or environmental disturbances do not allow good aiming accuracy, or if the concentrator construction utilizes an inherently approximate version of the linkage, then the dimensions of the radiation receiver may have to be considerably larger than the size of an individual mirror.

While in the discussion of the geometry of this invention, the terms radiation receiver and aiming point are used interchangeably, it might be well to note that it is not essential that the radiation receiver be physically located at the aiming point. A number of schemes for secondary radiation concentration have been proposed, and typically these are characterized by the radiation receiver being displaced from the original aiming point. Hence if secondary concentration means are to be used, the term "radiation receiver" as used herein should in many cases be replaced by the term "aiming point".

BRIEF DESCRIPTION OF THE DRAWINGS

FIG. 4 is a perspective view, shown without the mirrors, of a form of the invention adapted for use in relatively large installations;

FIG. 5 is an enlarged fragmentary cross section view, taken along line 5—5 of FIG. 4, showing an expansion joint for use in the collector of FIG. 4;

FIG. 7 is an enlarged perspective view of an adjustable mirror mount assembly for use in the collector of FIG. 4;

FIG. 8 is an enlarged fragmentary perspective view showing a positional guide component from the collector of FIG. 4;

FIG. 16 is a schematic block diagram showing a control system appropriate for use with the collector of FIG. 1;

FIG. 17 is a schematic block diagram of a known control system for central control of a plurality of variable speed motors, as appropriate for use in the collectors of FIGS. 4 and 9;

FIG. 19 is a diagram used for evaluating the potential for mechanical interferences between components of the invention.

DESCRIPTION OF THE PREFERRED EMBODIMENTS

The present invention is a solar collector having a central receiver, which utilizes a rigid mechanical linkage to control the orientation of a plurality of mirrors which reflect the beam component of solar radiation onto the receiver. Several specific embodiments of the invention are set forth. It will be recognized that many variations of these general embodiments are possible.

Figure 1:
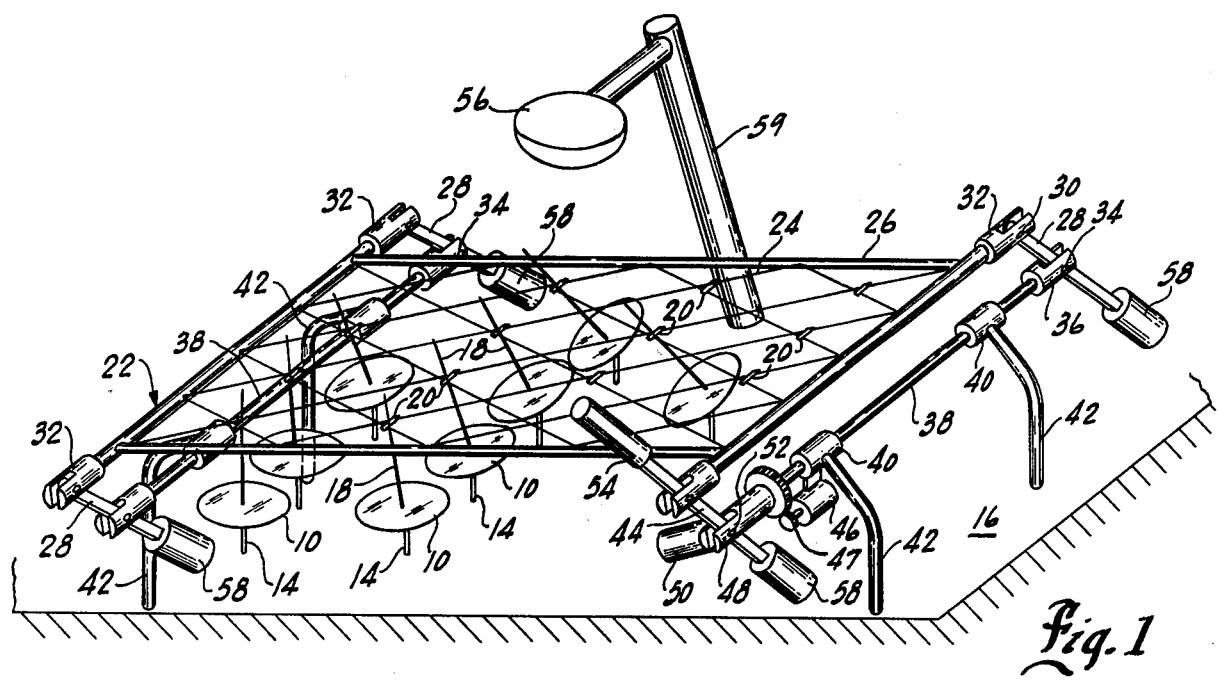
FIG. 1 is a perspective view, showing only a partial complement of mirrors, of a form of the invention adapted for control by a single pair of actuators, therefore suitable for small installations.
Figure 2:
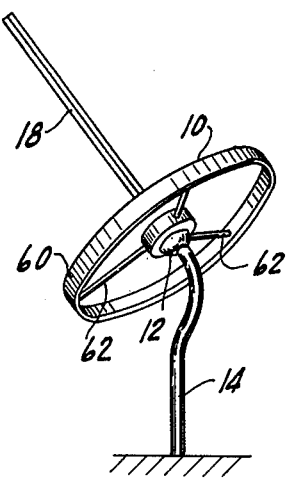
FIG. 2 is an enlarged perspective view of an individual mirror assembly suitable for use in the collector of FIG. 1.
Figure 3:
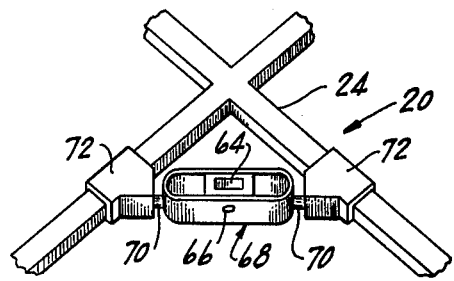
FIG. 3 is an enlarged fragmentary perspective view showing a positional guide component from the collector of FIG. 1.

Referring now to FIGS. 1–3 of the drawing, there is shown a preferred embodiment of the invention which is adapted to relatively small installations. In this embodiment, each of a plurality of mirrors 10 is articulatably coupled by a ball and socket joint 12 to an individual fixed post 14 which is fixed to a first rigid structure 16 which may be either a specifically manufactured component of the collector or the portion of the earth's surface over which the collector is disposed, or some pre-existing rigid structure such as the roof of a building. Coupled orthogonally to each mirror 10 is a linear guide member 18, for which a direction in space is established by slidable engagement to one of a plurality of positional guides 20, which are carried by a second rigid structure 22 comprised in this example of a lattice 24 of rigid, or at least unstretchable, members fixed to a rigid peripheral frame 26. The second rigid structure 22 is partially supported by a plurality of passive movable parallel support arms 28, each one of which is connected by an individual pivot 30 to one of a plurality of rotatable joint members 32 carried by the peripheral frame 26. Each of the parallel arms 28 is in turn supported at an individual fixed point by connection to an individual pivot 34 carried by one of a plurality of rotatable joint members 36, which may preferably be connected in pairs by rotatable shafts 38, which pass through support bushings 40 carried by support legs 42 fixed to the first rigid structure 16. In this system, the orientation of the passive parallel arms 28 may be established by driving a particular driven arm 44 with a first servomotor 46 which, by means of gear train 47, rotates the particular driven rotatable joint member 48 which supports the driven arm 44 and by a second servomotor 50 which rotates the driven arm 44 about the driven pivot 52 which connects the driven arm 44 to the driven rotatable joint member 48. The servomotors 46 and 50 are controlled by a system (schematically shown in FIG. 16) which includes a sun sensor 54 having sensing elements aligned orthogonally to the axes of rotation about which servomotors 46 and 50 act. The sun sensor 54 may be fixed to the driven arm 44 as shown or to any of the passive arms 28. The control is to be such that the parallel passive arms 28 and driven arm 44 are aligned parallel to the direction of incoming sunlight. Given the original proper disposition between the pluralities of mirror mount joints 12 and positional guides 20, the mirrors 10 will then be kept continually in alignment to reflect sunlight onto the radiation receiver 56. To reduce the power requirements of the servomotors 46 and 50, the weight of the second rigid structure 22 is counterbalanced by counterweights 58.

It may be noted that if the collector were constructed with an orientation such that the shafts 38 were contained in a vertical plane oriented in the north-south direction and were sloped toward the equator with a slope equal to the latitude at which the collector is used, the appropriate speed for the servo system motor 46 to drive the driven rotatable joint member 48 would be a constant 15 degrees per hour. In that case, it would be feasible that motor 46 would not be a servomotor but rather that it would be a constant speed motor, provided appropriate means of accurately turning on motor 46 were utilized. It is probably preferable to orient the shafts 38 in the north-south direction even if they are not sloped.

The radiation receiver 56 is supported at a point generally over the center of the mirror field by a support 59 extending from outside the mirror field. Support 59 will generally contain heat transfer means to transfer heat energy from the radiation receiver 56 to a use region, or to remove waste heat in the event the use region is contained within the radiation receiver 56.

The fixed post 14 shown in FIG. 2 is of a type which might be used in the perhipheral regions of the mirror field, in that the ball and socket joint 12 is mounted in a tilted position which increases the range of possible angular motion which may be made in the direction of tilt without producing internal interference within the ball and socket joint. The tilt is achieved by having the upper portion of the post 14 curve first away from and then back toward the extended line of the lower straight portion so that the center of rotation of the ball and socket joint 12 is in line with the straight lower portion of the post 14, in order to facilitate proper positioning of the center of rotation of the ball and socket joint 12. The direction of tilt should be generally toward the radiation receiver 56. As further shown in FIG. 2, the rotatable socket component of the ball and socket joint 12 is fastened to a ring frame 60 by braces 62. The mirror 10 may thus be of metallized plastic film stretched over the ring frame 60, or it may be of glass in which case the ring frame 60 might still be used if constructed with a mass distribution which would serve as a counterweight for the mirror 10 and the linear guide member 18, so that the center of gravity of the combination would coincide with the center of rotation of the ball and socket joint 12. The linear guide member 18 is shown with a rectangular, rather than circular, cross section which allows it to function in combination with the positional guide 20 which engages it, as an angular coupling which keeps the mirror 10 in a defined rotational position about the axis direction defined by the direction of the linear guide member 18. This particular feature is not required for round mirrors 10 as shown in FIGS. 1 and 2, but is desirable if square mirrors were employed and is essential for other possible preferred embodiments of the invention. Depending on the structure of the mirrors 10, the linear guide member 18 may either pass through a hole in the mirror 10 and connect to a fitting, not shown, in the socket component of the ball and socket joint 12, or it may connect to a fitting, not shown, adhesively bonded to the surface of the mirror 10.

As shown in FIG. 3, the positional guides 20 are doubly pivoted articulated joints comprised of a bushing 64 which is connected by pivots 66 within a rotatable slotted structure 68 which is in this example connected by pivots 70 which extend from the ends of the slotted structure 68 into fittings 72 mounted on members of the lattice 24 near a point of intersection. The bushing 64 slidably engages a linear guide member 18.

The collector may further include a transparent protective covering, not shown, which would protect the mirrors 10 from the wind and from some other environmental effects and greatly reduce the rigidity requirements for the second rigid structure 22. Such protective coverings would be most usable on small collectors constructed with a southward tilt, as such a covering on a horizontal collector would reflect away a large fraction of the incident radiation during conditions of low sun elevation in the winter.

When the second rigid structure 22 is positioned above the mirrors 10, as is the case in FIG. 1, it is generally desirable that the members comprising the lattice 24 have as small cross section as is consistent with the degree of rigidity required, as these members will block a portion of the sunlight both on its passage to the mirrors 10 and on its path to the radiation receiver 56. For a small collector having the concentrator portion protected by a transparent covering and having each mirror 10 counterweighted with a ring frame 60, it would be possible to fabricate the lattice 24 of members having quite small cross section and little inherent rigidity provided they had high tensile modulus and tensile strength and and were carried in a condition of high tension by the rigid peripheral frame 26. However, for a larger collector having no protection from the wind, the rigidity of the second rigid structure 22 should be obtained by the use of rigid members for the lattice 24, while the rigid peripheral frame 26 would play a lesser role or be dropped from the structure altogether. In order to support the more massive lattice 24 for a large collector, it becomes necessary to distribute passive support arms 28 or driven support arms 44 throughout the mirror field.

Referring now to FIGS. 4–8, there is shown, without the mirrors, a preferred embodiment of the invention as adapted to moderately large scale installations. FIG. 4 shows a lattice 24a made up of orthogonal members forming a square or rectangular pattern. Other patterns, such as one based on equilateral triangles might also be used. As shown in FIG. 4, the lattice 24a is supported by a plurality of individual support arm assemblies 72, distributed throughout the field of the collector. While the lattice 24a of FIG. 4 is shown to assume the total role of the second rigid structure 22 of FIG. 1, this is not to preclude the possibility that some peripheral frame members might be used for edge reinforcing in the larger collector. It is contemplated that the lattice 24a of FIG. 4 would be constructed of steel or aluminum pipe, using available types of fittings adapted to pipe construction. The radiation receiver 56a is shown supported on a tower 74 which extends through a centrally located opening in the lattice 24a. The individual mirrors are not shown in FIG. 4, but it is assumed that the rigid structure which carries the mirrors in fixed spatial relationship is in this case the local earth surface over which the collector is positioned. The scale of FIG. 4 is to be understood to be such that the lattice 24a is sufficiently far off the ground that people may readily walk beneath it to carry out assembly work and maintenance.

It will be noted that the lattice 24a of FIG. 4 is shown to be segmented into four segments which are not shown to be connected except at a single point designated as the position of the line 5—5 which designates the section shown in FIG. 5. The reason for segmenting the lattice 24a is that thermal expansion and contraction of this component due to changing ambient temperatures is one of the foremost limitations on the performance of the collector. Segmenting the lattice 24a and moving each segment with a plurality of individual support arm assemblies 72 appears to be the simplest means of reducing the mirror misalignment which would be produced by the thermal expansion and contraction of a very large single structure. The complete separation of the segments of the lattice 24a shown in FIG. 4, however, is for emphasis only. It is desirable that generally vertical forces normal to the plane of the lattice 24a be transmittable between individual segments in order to optimally utilize the individual support arm assemblies 72. It is therefore preferable that the lattice be continued into the regions shown as gaps between lattice segments in FIG. 4, but that each connection be made in the form of the expansion joint as shown in the section view represented by FIG. 5.

FIG. 5 shows an expansion joint 76 formed at the junction of two pieces of steel pipe 78 and 80 which extend from adjacent sections of the segmented lattice 24a of FIG. 4. The inner diameters of pipes 78 and 80 are bored to a smooth uniform surface in the region of their ends and a steel cylinder 82 is fitted snugly within them. A gap is left between the ends of the pipes 78 and 80 which is generally greater than the expected changes in dimension, brought about by changes in ambient temperature, of an individual segment of the lattice 24a of FIG. 4. A rubber sleeve 84 is placed over the junction to keep moisture out.

Figure 6:
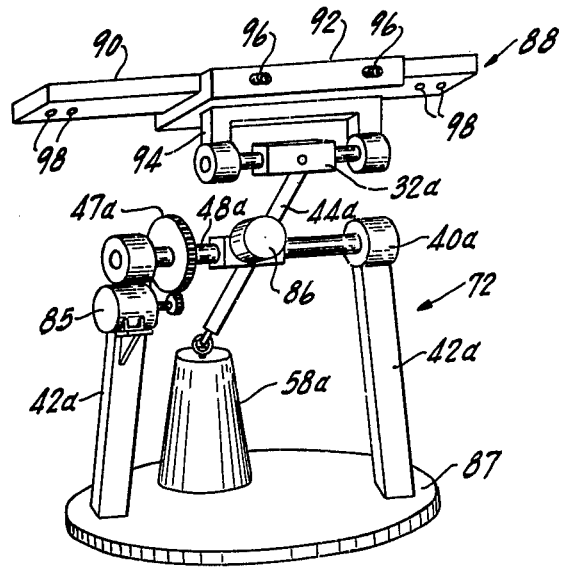
FIG. 6 is an enlarged perspective view taken along line 6—6 of FIG. 4 of a support arm and actuator assembly used in the collector of FIG. 4.

FIG. 6 shows an individual support arm assembly 72 which is generally designed to be placed as needed within the mirror field in replacement of an individual mirror. Normally from five to ten per cent of the possible mirror sites in the mirror field will be occupied by individual support arm assemblies 72. While the individual support arm assembly 72 shown in FIG. 6 is a driven assembly, the motor 85, which rotates the driven rotatable joint member 48a, and motor 86 which rotates the driven arm 44a about a pivot carried by the rotatable joint member 48a would not be servomotors in the convention sense as are motors 46 and 50 of FIG. 1, but would rather be geared A.C. synchronous motors driven by separate variable frequency sources. The motor 85 of each support arm assembly 72 in all segments of the lattice 24a of FIG. 4 would be driven by a single variable frequency source. Similarly all motors 86 would be driven by a single source. While there is no requirement that all the support arm assemblies be driven, since support can also be provided by passive arms, the cost of adding additional motors to the variable frequency drive system would probably be sufficiently low that it would be preferable to have all the individual support arm assemblies 72 be driven assemblies. In addition to the driven support arm 44a, the support legs 42a, the support bushings 40a, the counterweight 58a, and the rotatable joint member 32a and the driven rotatable joint member 48a, which are in common with the collector shown in FIG. 1, the individual support arm assembly 72 includes a base 87 and an adjustable mounting assembly 88 which includes a mounting bar 90, a mounting bar holder 92, and a bracket 94 which is fixed to the mounting bar holder 92 and carries the rotatable joint member 32a. The need for adjustability in the mounting assembly 88 stems from the fact that the individual support arm assembly 72 must fit the space normally occupied by a single mirror, which will be positioned differently with respect to members of the lattice 24a in different parts of the mirror field. The mounting bar 90 can be shifted within the mounting bar holder 92 by loosening set screws 96. Preferably the plurality of individual support arm assemblies 72 will be oriented so that the rotatable joint members 32a and 48a and the mounting bar 90 of each support arm assembly 72 are aligned parallel to one of the sets of orthogonal members comprising the lattice 24a of FIG. 4. Normally the mounting bar 90 will be positioned below lattice members which are orthogonal to itself, and fixed to the lattice 24a by bolts, not shown, which engage the holes 98 in the mounting bar. The base 87 should be anchored sufficiently deeply in the ground as to be stable against displacement by normal environmental factors.

FIG. 7 shows an adjustable mirror post assembly suitable for use with the solar collector of FIG. 4. This post assembly includes a fixed base 100 which is to be anchored in the ground. A post flange 102 rests on the upper surface of the fixed base 100 and is held firmly to it by hold down screws 104 contained in hold down brackets 106 which are fixed to the fixed base 100. The relative dimensions of the fixed base 100 and the post flange 102 are such that the post flange 102 may be adjusted in position over a significant range of positions when the hold down screws 104 are loosened. Fixed centrally to the post flange 102 is a tubular lower post 108 within which is fitted an upper post 110 which is held in a fixed position by set screw 112. Fixed to the upper post 110 is the ball component of the ball and socket joint 12a. The final adjustment procedure for positioning the center of rotation of the ball and socket joint 12a may best be carried out while no mirror is mounted on the particular post. Therefore the mirrors, which are not shown in this particular example, should be fixed to a connecting member which may be readily attached to the socket component of the ball and socket joint 12a. This connecting member may simply consist of a ring which fits around the socket of the ball and socket joint 12a, with set screws for securing the connection.

FIG. 8 shows a positional guide 20a which differs in several respects from the version shown in FIG. 3 and is better adapted to use in the collector of FIG. 4. In FIG. 8, the pivot 70a is carried by bracket 114 which is fixed to a member of the lattice 24a of FIG. 4 by U bolts 116. In FIG. 3, the positional guide 20 was depicted as being supported by two intersecting members of the lattice 24 of FIG. 1. This was desirable because an individual lattice member of a lattice which depends primarily on a peripheral frame for its rigidity may not have adequate torsional rigidity to carry the positional guide. The more massive lattice 24a of FIG. 4 can readily support a positional guide. A specific desired effect of using the structure shown in FIG. 8 for the positional guide 20a with the lattice 24a FIG. 4, which is shown as a square lattice, is to make the direction of the pivot 70a parallel to one of the orthogonal directions of the members of the square lattice 24a shown in FIG. 4. It would generally be appropriate to use square mirrors with square lattices in order to get the greatest mirror coverage. However, this requires either that the combination of positional guide 20a and linear guide member 18a function as an angular coupling to keep the mirrors in a definite rotational position about an axis along the linear guide member, or that some other type of joint than a ball and socket joint be used in the mirror mount so that the joint could perform that function. It is assumed here that the combination of positional guides 20a and linear guide members 18a would perform that role. Considerations of mechanical interferences between the mirrors then dictate that, if the mirror size is basically that of the lattice spacing, the pivot 70a of the positional guide 20a should be parallel to one of the orthogonal directions of the members of the square lattice 24a of FIG. 4. If the pivot 70a were diagonal to the lattice members of a square lattice as would be the case for a positional guide of the type shown in FIG. 3, it would be appropriate to use square mirrors roughly 1.4 times as large as the lattice spacing, with positional guides located on only half the intersections of lattice members. This would result in under utilization of the lattice members and excessive sun blockage in the relatively massive lattice of FIG. 4.

A further feature of the positional guide 20a shown in FIG. 8 is that the bushing 64a has been elongated to extend below the lattice 24a. The purpose for this feature is to allow the linear guide members 18a to be shortened so that, when the arm 44a of each support arm assembly 72 is normal to the plane of the lattice 24a, the linear guide members 18a will not extend above the plane of the lattice 24a. The length of the bushing 64a of FIG. 8 required to achieve this will generally be under half the distance between joint connections to the arm 44a of the support arm assembly 72. The reason for desiring this feature is that it allows netting to be spread over the lattice 24a in the event of threatening hailstorm.

Figure 9:
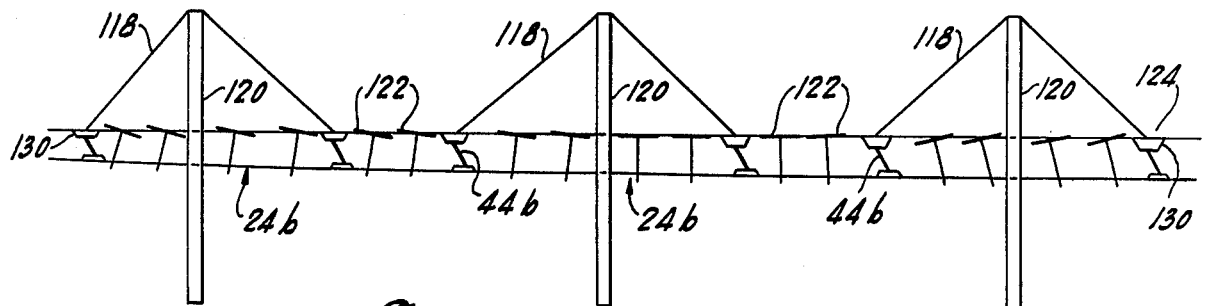
FIG. 9 is a diagrammatic side view, shown without the radiation receiver, of a form of the invention adapted for suspension over a surface.
Figure 10:
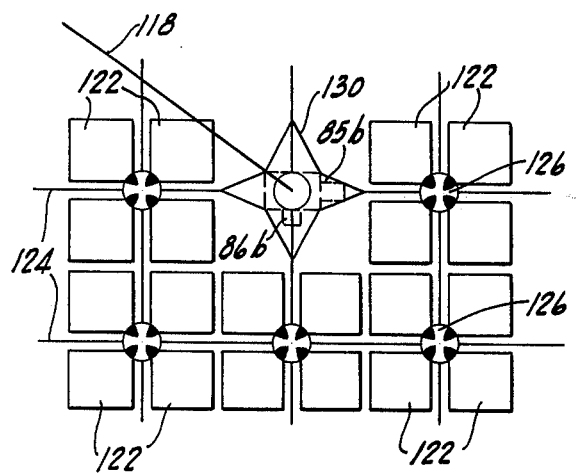
FIG. 10 is an enlarged fragmentary top view showing a group of segmented mirrors and a support and actuating assembly from the collector of FIG. 9.
Figure 11:
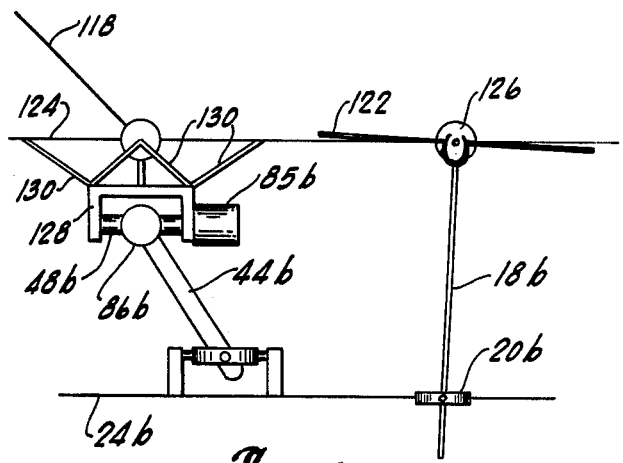
FIG. 11 is an enlarged fragmentary side view showing a support and actuating assembly and a mirror assembly from the collector of FIG. 9.

Referring now to FIGS. 9-11, there is shown a form of the invention which is adapted to conditions in which the concentrator portion of the collector is to be suspended so that the surface below may be used for functions other than solar energy collection. For example, in some cases the concentrator portion of such a collector might be placed over a parking lot, while the radiation receiver might be mounted on a nearby building. The distinctive feature of the form of the invention shown in FIGS. 9-11 is that the posts have been eliminated from the collector as being undesirable in a suspended structure. In FIG. 9, the concentrator portion of the collector is shown to be suspended by cables 118 suspended from poles 120. FIG. 10 shows the mirrors to be segmented square mirrors 122 and the first rigid structure which carries the mirrors 122 in a fixed spatial arrangement to be a square lattice 124 of relatively thin rigid members. At the intersections of members of the square lattice 124, there is a type of ball and socket joint 126, with the ball component centered at the point of intersection and the socket composed of four narrow segments adapted to grip the ball while avoiding interference with the members of the lattice 124. A segment of the segmented mirrors 122 is fixed to each of the four segments of the socket component of each ball and segmented socket joint 126. As shown in FIG. 11, a linear guide member 18b is fixed to the socket of the ball and segmented socket joint 126 at the junction of the socket segments. Each linear guide member 18b is slidably engaged by a positional guide 20b carried by a second rigid structure lattice 24b. In order that a segmented mirror 122 avoid interference with the members of the first rigid structure lattice 124, the combination of linear guide member 18b and positional guide 20b must be such as to function in combination as an angular coupling and the fixed pivot axis direction of the positional guides 20b must be generally parallel to one of the orthogonal directions of the lattice members in the first rigid structure lattice 124. Also each mirror 122 must lie in a plane containing the center of rotation of the associated joint 126. The mirror segments are preferably formed of metallized plastic film stretched over a two dimensional frame.

The second rigid structure lattice 24b is suspended below the first rigid structure lattice 124 by a plurality of individually driven support arms 44b which are driven by motors 85b and 86b. The driven rotatable joint member 48b of FIG. 11 is held by bracket 128 which is connected by bracing members 130 to the lattice 124. No counterweight is shown as it is not clear that the value of counterweights warrants the requirement that additional weight be suspended. Achieving the appropriate spacing between the positional guide 20b and the associated mirror mount joints 126 of FIGS. 9-11 requires that at least one of the lattices 24b or 124 be curved. However, the degree of curvature required is typically quite low. It will normally be appropriate to construct both lattices 24b and 124 as plane lattices. By choosing appropriate lengths for the cables 118, the upper lattice 124 is suspended in a generally plane form. By varying the lengths of the bracing members 130 at different points in the collector, the lattice 24b of FIGS. 9-11 would be allowed to sag under gravity into the desired curved shape. Given that the first rigid structure lattice 124 is square, the appropriate form for the second rigid structure lattice 24b would be not quite square. The deviation from squareness of the second rigid structure lattice 24b would generally be sufficiently small that the pivots of the positional guides 20b could be aligned with the members of the lattice 24b rather than with the members of the lattice 124 without causing undue interference between the segmented mirrors 122 and the lattice 124, provided the gap between mirror segments was reasonably wider than the thickness of the members making up the lattice 124.

Although the radiation receiver is not shown in FIG. 9, it will be noted that the bracing members 130 are shown as becoming progressively longer from left to right in the figure. This causes the spacing between the second rigid structure lattice 24b and the first rigid structure lattice 124 to increase from left to right and indicates that the radiation receiver is located somewhere above the right hand side of the concentrator, as might be appropriate if the radiation receiver were mounted on an adjacent building.

The degree of rigidity expected from the nominally rigid members of the suspended collector of FIG. 9 would normally be considerably less than the rigidity appropriate for the collector of FIG. 4 and the possible concentration factors would therefore be considerably lower. However, the benefits of placing the suspended concentrator of FIG. 9 in areas which would not be available for surface mounted collectors would offset the lower expected performance in many cases.

Figure 13:
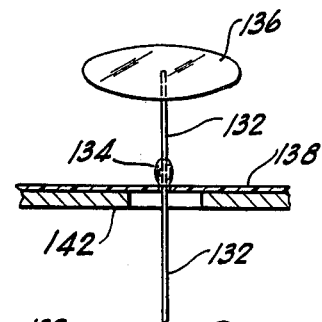
FIG. 13 is an enlarged fragmentary detail view of a mirror assembly from the collector of FIG. 12.
Figure 12:
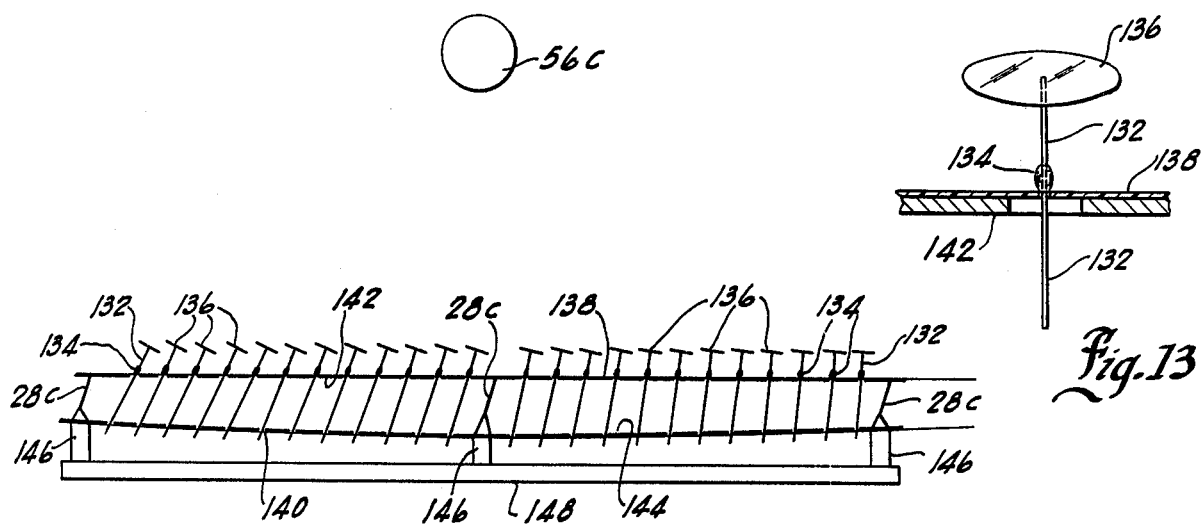
FIG. 12 is a diagrammatic side view of a form of the invention adapted for the use of very small mirrors.

Referring now to FIGS. 12 and 13, there is depicted a form of the invention particularly adapted to the use of very small mirrors, as for example would be appropriate if a large number of mirrors were to be used in a small model of the collector for educational or display purposes. Because of the small mirror size, this form of the invention could also form a very low profile functional collector. In this form of the invention, the functions of the post 14 and linear guide member 18 of the collector of FIG. 1 are assumed by a single linear component, which because of its small size will be called a pin 132 of FIGS. 12 and 13. Along the length of each pin 132 there is a thickened region 134 which functionally divides the pin 132 into a generally longer portion and a generally shorter portion. A small round mirror 136, preferably formed of metallized self-supporting plastic film, having a diameter roughly equal to the length of the shorter portion of a pin 132 is fixed orthogonally to the free end of the shorter portion of each pin 132. To properly orient the pins 132 and mirrors 136, the longer portion of each pin 132 is inserted into one of a plurality of spaced small holes in an upper layer of thin durable material 138 and into an associated hole of a plurality of spaced small holes in a lower layer of thin durable material 140 which is spaced from the upper layer of material 138. The thickened region 134 on the pins 132 serves as a stop to prevent further passage of the pin 132 through the upper layer of material 138. The layers of material 138 and 140 may be for example sheets of Mylar plastic film, or possibly a fabric. The upper layer of material 138 is supported and shaped by a shaping framework 142, which is preferably a plane framework. The lower layer of material 140 is supported and shaped by a shaping framework 144. The shaping frameworks 142 and 144 are coupled by a plurality of parallel arms 28c, at least some of which should be linked by a common shaft such as 38 of FIG. 1. The shaping frameworks 142 and 144 may be formed from sheet metal or molded from rigid plastic, with relatively larger holes placed in the regions where the small holes are to be positioned in the thin layers of material 138 and 140. One of the shaping frameworks will typically be a plane framework and it could be formed of a relatively open lattice of rigid material.

The alignment of the pins 132 and mirrors 136 will not be exact for this form of the invention because the mirrors 136 will not be located at a fixed position relative to the radiation receiver 56c. The mirrors 136 of FIGS. 12 and 13, which undergo substantial transulational motion relative to the mirror size are therefore not equivalent to the mirrors 10 of FIGS. 1 and 2 which rotate about a fixed point which is generally separated from the plane of the mirror 10 by a distance which is very small compared to the dimensions of the mirror. However, the distance by which the center of each reflected beam from the mirrors 136 of FIG. 12 misses the fixed aiming point solely because of the translational motion of the mirrors 136 will not be greater than the length of the pins 132 and will normally be much less than this. Specifically the miss distance of a specific mirror 136 due to its translational motion will not be greater than the distance from the mirror 136 to the engagement of the pin 132 with the fixed layer of material 138 or 140, provided the holes in the fixed layer of material 138 or 140 are related to the associated holes in the complementary mobile layer of material by the positional relationship approrpiate for a mirror mount joint and positional guide respectively. For a small collector of the type depicted in FIG. 12, such as might be used for display purposes, it would clearly be advantageous to make the upper shaping framework 142 the dominant structure which would be kept fixed with respect to the radiation receiver 56c. The lower shaping framework 144 would be suspended below the upper shaping framework 142 by means of the parallel arms 28c. However, for a larger version of the collector of FIG. 12, structural requirements would almost certainly dictate that the lower shaping framework 144 be fixed, with the upper shaping framework 142 supported and moved by the parallel arms 28c. In that case, it is appropriate to support the lower shaping framework 144 by bracing members 146 fixed to a base member 148 in order to help maintain the desired shape for the lower shaping framework 144.

As the collector of FIG. 12 might readily incorporate many thousands of mirrors 136 into a collector of relatively modest size, it is apparent that an efficient means of inserting the pins 132 through the layers of material 138 and 140 would be required. An appropriate procedure would be to fabricate the layers of material 138 and 140 and the shaping frameworks 142 and 144 in narrow sections which would allow retractable pin insertion guides to be deployed from the sides of each section above both layers of material 138 and 140 during fabrication. The pins 132 carrying mounted mirrors 136 would be moved through the pin insertion guides and through pre-punched holes in layers of material 138 and 140 by rather non-directional elastic pushers. The individual narrow sections would be assembled into a complete collector of FIG. 12 after the pins 132 and mirrors 136 were in place and the pin insertion guides removed. Before insertion, the pins 132 should preferably be coated, near the thickened region 134, with a high friction coating, such as the material sold under the name of liquid rubber, in order to keep the pins 132 from riding up due to the relative motion of layers of material 138 and 140.

Figure 14:
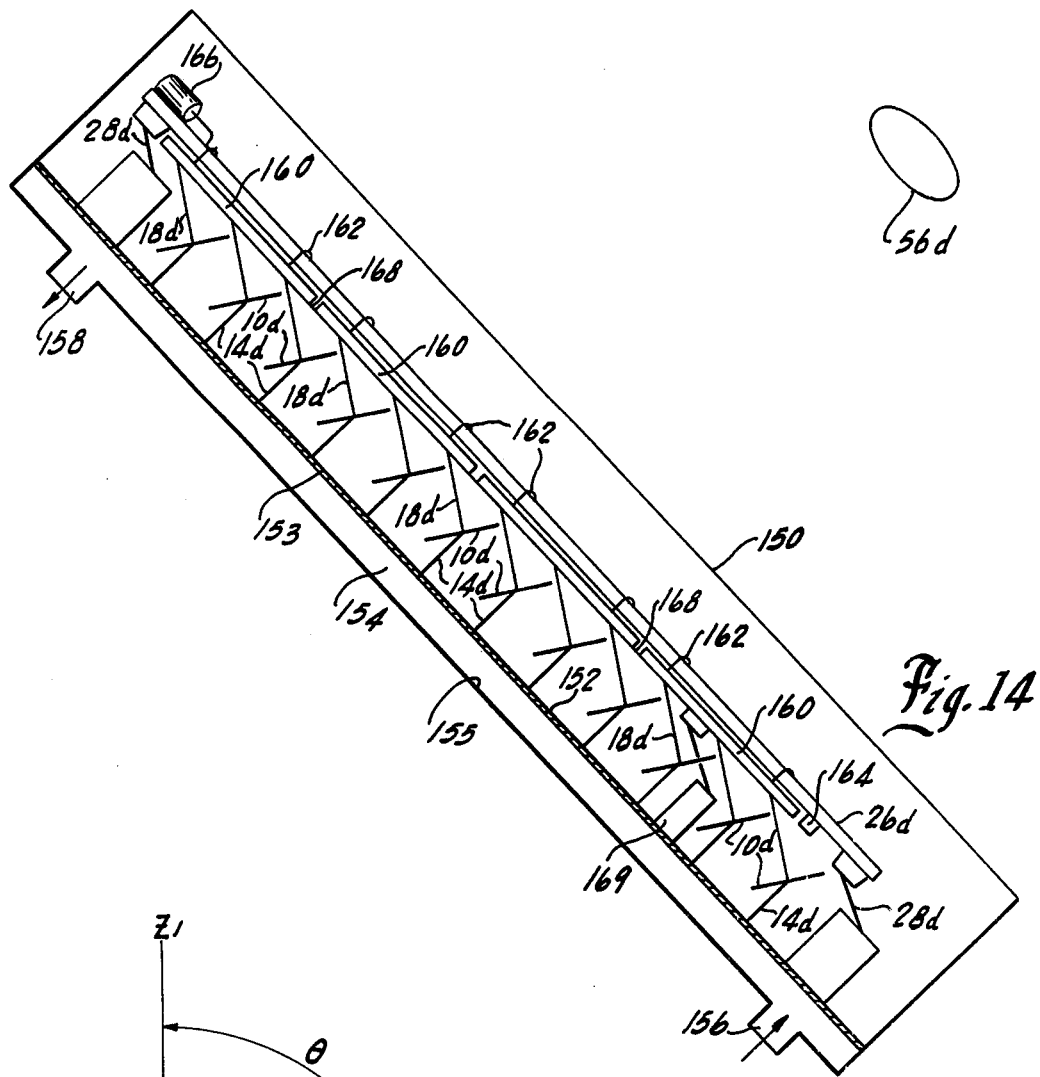
FIG. 14 is a diagrammatic side view of a form of the invention in which the concentrating collector is convertible to flat plate use in the absence of a beam component of solar radiation.
Figure 15:
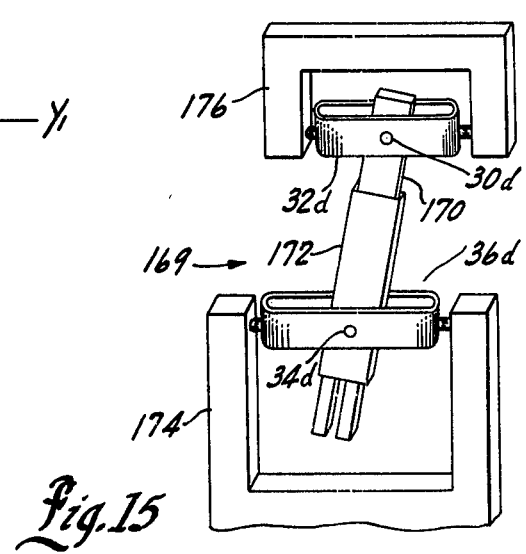
FIG. 15 is an enlarged perspective view showing an extendible support arm assembly for use in the collector of FIG. 14.

Referring now to FIGS. 14 and 15, there is diagrammatically shown a frequently desirable modification of a form of the invention which is assumed in FIG. 14 to be of the embodiment shown in FIG. 1, but which also could be applied to the embodiment of FIG. 12 if an open lattice structure were used for the upper shaping framework. The modification is designed to allow a small collector, whose functions include space heating, to switch to a rudimentary form of flat plate collector on overcast days in order to utilize diffuse solar radiation which may be present. The concentrator portion of the collector of FIG. 14 is protected by a transparent covering 150 which generally would be present on small tilted collectors regardless of whether a flat plate capability is desired. The modified collector of FIG. 14 also includes a broad area radiation absorbing surface 152 located under the mirrors 10d, or on the opposite side of the mirrors from the radiation receiver 56d. Energy absorbed by the broad area radiation absorbing surface 152 is conducted through a relatively thin sheet of metal 153 upon which the absorbing surface 152 is deposited. The heat energy is then picked up by air flowing through a duct 154 formed between the sheet of metal 153 and a back wall 155. Air is forced through the duct 154 from entrance port 156 to exit port 158 by a fan, not shown. Although the mounting posts 14d are shown as terminating at the absorbing surface 152, the posts 14d and other mechanical components will normally be fixed to studs, not shown, which extend between the back wall 155, which should be rigid, and the metal sheet 153.

In order that as much diffuse radiation which enters the protective transparent covering 150 be allowed to reach the absorbing surface 152 as possible during overcast periods, it is desired first that the mirrors 10d be made reflective on both their front and back surfaces, and second that the mirrors 10d all be tilted to a large angle with respect to the plane of the collector. As the mirrors 10d cannot all be simultaneously tilted to a large angle with respect to the plane of the collector so long as they are rigidly linked in the concentrating mode, it is desirable that means for disrupting the rigid mechanical linkage be incorporated into the collector. In FIG. 14, the linear guide members 18d are shown to be engaged by a sectioned structure 160 which carries the positional guides which are not shown in this figure. Each section of structure 160 slidably engages a peripheral frame 26d by means of slide members 162. An individual section of structure 160 may typically comprise a narrow secondary frame extending across the width of the collector, with the secondary frame carrying a narrow lattice section which carries the positional guides which engage the linear guide members 18d. The positional guides are carried by the sectionable structure 160 in such a position that when the sections are compacted together and forced against a stop 164 mounted on the peripheral frame 26d, the positional guides will be in the concentrating mode so that when the parallel support arms 28d which carry the peripheral frame 26d are aligned in the direction of the sun, the mirrors 10d will reflect sunlight onto the radiation receiver 56d. However, in the prolonged absence of a concentratable beam component in the solar radiation, a mode changing linear actuator 166 can pull on the section of the structure 160 which is most distant from the stop 164, with the force being transmitted in turn through flexible connections 168, which extend between sections of structure 160, until the sections have been spread apart by an amount determined by the length of flexible connections 168 which are chosen so that, in the fully extended position, the positional guides have generally the same average spacing in the direction of extension as do the fixed mirror mount joints. All the mirrors 10d of FIG. 14 can in this way be simultaneously tilted to as large an angle as is allowed by interference considerations, which will typically be on the order of 60°.

FIG. 15 shows an extendible support arm assembly 169 adapted for use in supporting the individual sections of structure 160 in FIG. 14. The long narrow sections of structure 160 will typically be particularly needful of support normal to their plane, but they cannot be supported by fixed arm supports 28d if they are to be disrupted from their normal concentrating mode position. The extendible support arm assembly 169 can support the structure 160 when this structure is in the concentrating mode, and release it when the sections are spread apart. As shown in FIG. 15, the extendible support arm 170 is slidably engaged by an elongated bushing 172. The extendible support arm 170 is pivotally connected to the rotatable joint member 32d by pivot 30d. The elongated bushing 172 is pivotally connected to the rotatable joint member 36d by pivot 34d. The lower end of the extendible support arm 170 is slotted so as to slide by pivot 34d. However, at the position where the distance between pivots 30d and 34d is the same as for the fixed length support arms 28d, which carry the peripheral frame 26d, the slot stops and support arm 170 acquires full support function. The support arm assembly is fixed to the first rigid structure by bracket 174 and to an individual section of structure 160 by bracket 176.

Referring now to FIG. 16, there is shown a schematic of a control system adapted for use with collectors such as that of FIG. 1, in which the orientation of the parallel arms which carry the second rigid structure is established by a single pair of servomotors. Systems are known for keeping an object pointed toward the sun by a first servomechanically controlled rotation about a fixed axis and a second servomechanically controlled rotation about a pivot which is orthogonal to the fixed axis and which is rotated by the first servomechanism. In particular, reference is made to U.S. Pat. No. 3,305,686, in which each servomechanism is controlled by a focusing sun sensor using series opposed thermocouple transducers arranged diametrically opposite each other just outside the focused beam of the sensor along a line normal to the axis about which the servemechanical control is applied. Apparently this control system has good stability and pointing accuracy. However, the sensor appears to be inherently highly directional and to lack the capability of automatically acquiring an initial fix on the sun. An alternate form of servomechanism control which claims to have good wide angle acquisition capability and also good pointing accuracy is shown in U.S. Pat. No. 3,229,102 in which the sensor utilizes photocells inclined to a reference axis to provide output for the control system. However, to maintain good pointing accuracy, the system described in this patent uses a relatively sophisticated adjustment scheme to correct for photocell aging. Structurally, the directional sensor of U.S. Pat. No. 3,305,686 and the wide angle sensor arrangement taught in U.S. Pat. No. 3,229,102 would appear to be compatible for use in a single unit, as the sensing elements of the former patent are to be contained within a tubular structure, while the wide angle sensing elements of the latter patent could be located outside a tubular structure. Acquisition capability and fine pointing capability could then be obtained by switching between sensing elements as required, without the need for sophisticated correction for photocell aging. It may be noted, however, that the output levels of these two systems would normally be quite different; and considerable attenuation of the photocell output would be required to place it in the same general range as the thermocouple transducer.

The control system schematically shown in FIG. 16 includes separate sensing means for acquiring an initial fix on the sun, for maintaining accurate alignment with the sun, and for placing the collector in a preferred orientation if the sun is not shining. A directional sun sensor 178 is the primary guidance component and will be assumed to be based on the technology taught in U.S. Pat. No. 3,305,686. The directional sun sensor 178 may be connected to amplifier 180, which drives servomotor 46, by activating relay 184. In order to initially acquire a fix on the sun, wide angle sun sensor 186, which will be assumed to use the tilted photocell technique taught in U.S. Pat. No. 3,229,102, would be connected to amplifier 180 by activating relay 188. Sensors 178 and 186 in combination would comprise the sensing component 54 of FIG. 1, with the external sensing elements not shown in that figure. In the event that no concentratable beam component of solar radiation is available and it is desired to place the mirrors in a preferred orientation, as for example to switch to the flat plate capability of the collector of FIG. 14, then the control would be turned over to a combination or potentiometer linked to servomotor 46 and fixed voltage divider, with the combination, represented by reference character 190, connected to amplifier 180 by activation of relay 192. The potentiometer sensor is not shown in FIG. 1. As there are two axes about which servomechanical control must be applied, it is to be understood that the boxes labeled directional sun sensor 178 and wide angle sun sensor 186 actually represent only the sensing elements in one of two orthogonal directions and that all the components shown on the right hand side of FIG. 16 must be duplicated to provide for servomechanical control about the two orthogonal axes.

In order to place the servomechanisms under the control of the appropriate sensor there are to be several solar beam registers and time interval registers which are two level on-off devices, constructed according to known principles, which function in combination with appropriate gate circuits in order to activate a single one of the relays 184, 188 or 192. The directional beam register 194 has the function of determining whether the directional sun sensor 178 is pointed at the unobscured sun. Again assuming the directional sensor 178 is constructed along the lines outlined in U.S. Pat. No. 3,305,686, there would be a central focused beam, which would largely bypass the primary sensing elements, which could be utilized to activate the directional beam register 194. Register 194 could be comprised, for example, of a photocell, possibly in combination with appropriate optical attenuators to prevent overheating, which with appropriate power amplification means, acts at a predetermined light level to close a relay which connects a fixed voltage source to the output of the register. The photocell would be exposed to the central beam of the directional sun sensor 178 and the light level required to close the relay would be that obtained by pointing the sensor 178 at the generally unobscured sun. Activation of directional beam register 194 would assure an output from the OR gate 196 which would activate relay 184 and keep directional sun sensor 178 in control of the servomechanisms. The "on" output from OR gate 196 would also act through AND-NOT gate 198 and NOR gate 200 to assure that relays 188 and 192 remained unactivated. As brief obscurement of the sun should preferably not switch control of the servomotors to other sensors, a time delay register 202 would remain on for a period after directional beam register 194 had been turned off by obscurement of the sun and would keep the directional sun sensor 178 in control of the collector for generally the period of time in which the sun would remain within range of the sensor 178 which had been rendered stationary by the solar obscurement. If the sun remained obscured sufficiently long that it would be out of range of the directional sun sensor 178 upon re-emergence, then time delay register 202 would switch off and control of the collector would pass to the wide angle sun sensor 186, or the potentiometer and fixed divider 190, depending on the total duration of solar beam component over some appropriate time interval, as determined by the wide angle beam register 204 and time average register 206. The wide angle beam register 204, which is not shown in any of the pictorial figures of the drawing, is to be a fixed position on-off device which is turned on by light levels associated with the unobscured sun at any position. The time average register 206 is an on-off device which remains on only if the duration of the "on" time of the wide angle beam register 204 over some appropriate time interval is sufficiently large that it would be worthwhile bringing the collector to a focusing configuration. An appropriate system for the wide angle beam register 204 might for example comprise a plurality of photocells, each of which would be directed generally at some angular interval around a semicircle having its diameter aligned in the east-west direction and its plane tipped from the vertical toward the equator at an angle equal to the latitude of the collector; and with a light level discrimination means which is based on the peak intensity on any of the plurality of cells rather than on average intensity on all the photocells. This configuration would give the beam register 204 a relatively uniform sensitivity. It is particularly to be desired that the beam register 204 be sensitive to the early morning sun, so that by the time the sun is high enough in the sky for the collector to begin tracking, the wide angle beam register 204 will have been on sufficiently long that the time average register 206 will also have been switched on. This would produce an output from gate 198 which would activate relay 188, placing the collector under the control of the wide angle sun sensor 186. The servo controls would then quickly bring the directional sun sensor 178 into alignment with the sun, whereupon directional beam register 194 would be turned on and control shifted to the directional sun sensor 178. It is apparent that there are many possible variations on the control system shown, which is intended only as an example of the sort of controls which may be used.

FIG. 17 shows a sun sensor 208 applied to the control of a known type of multimotor drive in which a plurality of geared three phase synchronous motors would be powered by a variable frequency supply. This type of multimotor drive would be appropriate for the collectors shown in FIGS. 4–8 and 9–11. Sun sensor 208 in FIG. 17 is to include both directional and wide angle elements from FIG. 16, which together are designated by character 54 in the pictorial FIG. 1, together with appropriate switching means from FIG. 16. Except for the rectifier, the elements of FIG. 17 must be duplicated in their entirety to provide appropriate control about both orthogonal axes. Normally the sun sensing guidance means of 208 will be carried by the support arm 44a of a single support arm assembly 72 of FIGS. 4 and 6. It will be noted in FIG. 6 that the structure of the adjustable mounting assembly 88 as shown would preclude extending the arm 44a to carry the sun sensing means of 208. Therefore the particular support arm assembly 72 which carries the guidance portion of 208 will have an alternate mounting structure to that shown in FIG. 6. The alternate mounting structure will generally comprise a pair of separated mounting bars oriented orthogonally to the direction of the mounting bar 90 shown in FIG. 6, with each of the mounting bars having an individual bushing connection to an elongated version of the rotatable joint member 32a of FIG. 6.

Figure 18:
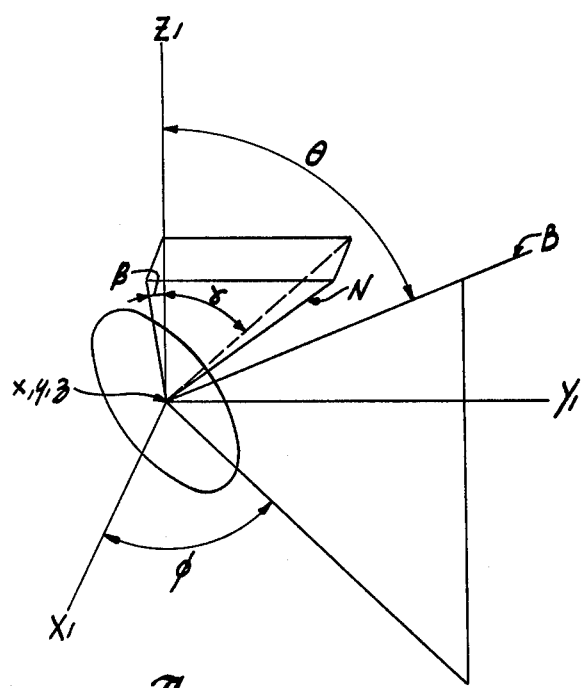
FIG. 18 is an angle resolution diagram useful in developing the equations which algebraically relate the positions of components in the invention.

FIG. 18 is a diagram which is helpful in formulating equations by which the positional relationship between mirror mount joints and positional guides may be algebraically expressed. As indicated in the summary, the geometric relationship which must exist between an individual positional guide and the associated mirror mount may be expressed in terms of the appropriate positioning of the positional guide and the center of rotation of the mirror mount on a spherical geometric surface which is common to the two components. However for purposes of depicting the geometrical relationship which may be more readily applied to the collective configuration of the pluralities of positional guides and mirror mount joints, it is desirable to establish a coordinate system for expressing the positions of these components. An appropriate coordinate system is a right handed rectangular coordinate system having coordinates X, Y and Z, in which the radiation receiver is located at the position $(0,0,h)$. It will then be possible to relate the position of each positional guide to the position of the associated mirror mount by inspection of the equations for the proper tilt angle components for a mirror, as resolved about fixed axes of resolution which are directed parallel to the X and Y coordinate axes. Referring now to FIG. 18 of the drawing, there is shown a mirror whose center of rotation is located at a position $(x,y,z)$ in the coordinate system containing the radiation receiver. At the local mirror site, there is shown a local coordinate system having axes $X_1$, $Y_1$, and $Z_1$, which are parallel to the X, Y and Z axes respectively of the principal coordinate system, which is not shown. A beam of sunlight B is incident from the sun which is positioned at a zenithal angle $\theta$ and an azimuthal angle $\phi$ measured with respect to the coordinate system axes. The angular position of the normal to the mirror N, expressed relative to a zero angle position in which the normal is directed along the $Z_1$ axis, is resolved into a component $\beta$ utilizing the $Y_1$ axis as an axis of resolution and a component $\alpha$ utilizing the $X_1$ axis as an axis of resolution. The slant distance between the radiation receiver at $(0,0,h)$ and the mirror at $(x,y,z)$ is $(x^2+y^2+(h-z)^2)^{\frac{1}{2}}$ and will be designated by S. It can be shown that if the mirror is properly oriented to reflect sunlight onto the radiation receiver at $(0,0,h)$ the tangent of $\beta$ and the tangent of $\alpha$ are given by the following expressions:

$$\tan \beta = \frac{\sin \theta \cos \phi - x/S}{\cos \theta + (h-z)/S}$$

$$\tan \gamma = \frac{\sin \theta \sin \phi - y/S}{\cos \theta + (h-z)/S}$$

In order to preserve the symmetry of the equations, both the angle $\alpha$ and all other angles shown in FIG. 18 are considered positive as shown, even though the angle $\alpha$ would represent a left-handed rotation relative to the right-handed coordinate system, while $\beta$ and $\phi$ represent right-handed rotations.

The expressions $\sin \theta \cos \phi$, $\sin \theta \sin \phi$, and $\cos \theta$ represent the direction cosines of the sun with respect to the X, Y and Z axes respectively. The possibility of using a rigid mechanical linkage to orient all the mirrors follows from the fact that changes in the expressions $(\sin \theta \cos \phi - x/S)$, $(\sin \theta \sin \phi - y/S)$, and $(\cos \theta + (h-z)/S)$, which are proportional to projected lengths on the X, Y and Z axes respectively, are equal to changes in the respective direction cosines of the sun's position irrespective of mirror coordinates. If the positional guides are to move in such a way that the mirror normals continue to satisfy the equations for $\tan \beta$ and $\tan \alpha$, then it follows that they will have to change position in the X, Y and Z directions by amounts given by some characteristic length L times the respective changes in the direction cosines of the sun's position. Each positional guide must therefore move over a spherical surface of radius L and must, at any given time, be located on this spherical surface at a point defined by the intersection with the surface of a line which passes through the center of the sphere and is aligned in the direction of the sun. The further requirement that the individual spherical surface over which a positional guide moves is properly positioned with respect to the associated mirror mount may be fulfilled by establishing the proper positional relationship for any selected value of sun position. The coordinate relationships appear simplest for a radiation source positioned along the Z axis, and so the relationships will be written for that position even though it may not correspond to a possible sun position. For a radiation source positioned along the Z axis, the proper position for a positional guide associated with a mirror mount located at $(x,y,z)$ is $(x-xL/S, y-yL/S, z+L+(h-z)L/S)$ if the positional guides are above the mirror mounts, or $(x+xL/S, y+yL/S, z-L-(h-z)L/S)$ if the positional guides are located below the mirror mounts. If the type of mirror system is one in which the placement of the mirrors takes priority over the placement of the positional guides, then the mirrors would be placed in an appropriate arrangement and the proper initial positions for the positional guides deduced from the expressions given. However, if the placement of the positional guides takes priority, as for example if the positional guides are to be positioned within a periodic lattice structure, care must be taken in inverting the relations given above to find the position of a mirror mount from the given initial position of a positional guide because the slant distance S between the point defining the position of the radiation receiver and the center of rotation of the mirror mount would not be known. However by defining a slant distance S'' between the position of the radiation receiver and the center of the sphere of radius L over which the positional guide moves, the position for the center of rotation of a mirror mount joint may be defined exactly from the given initial position of the associated positional guide. For a situation in which the positional guides are positioned above the mirrors and are placed in an initial position corresponding to the radiation source position lying along the Z axis, the distance S'' for a positional guide having an initial position of $(x',y',z')$ would be $S''=(x'^2+y'^2+(h-z'+L)^2)^{\frac{1}{2}}$ and the appropriate point at which to fix the associated mirror mount joint would be $(x'+x'L/S'', y'+y'L/S'', z'-L-(h-z'+L)L/S'')$.

For a collector of the type shown in FIG. 4, in which the mirror mount may be adjusted during assembly of the collector, the base members 100 would be generally positioned from the preplanned positions of the positional guides using the equations given above. However, after the lattice 24a and positional guides 20a were in place, the final positioning of the mirror mount would be made without the mirror or linear guide member being in place. A possible procedure for this positioning would be the following: A small but brilliant light source would be placed at the position to be occupied by the radiation receiver. All the support arms 44a of the support arm assemblies 72 would be placed in a vertical position. A lens, mounted so that it can be rotated about a vertical axis and tilted about a horizontal axis, would be hung in plumb position a distance L below an individual positional guide, where L would be equal to the distance between centers of rotation of the joint connections to the support arms 44a. The lens would have a focal length less than L; and a balance arm, carrying a screen with cross hairs mounted at the focal point of the lens, would be attached to the lens mounting. The balance arm would be moved to a position such that the image of the light source impinges on the cross hairs. The appropriate position for the center of rotation of the mirror mount joint would be at a distance L from the lens along the direction of the light beam. The balance arm would be locked in position and the mirror mount adjusted so that the ball component of the ball and socket joint 12a was at the appropriate position as shown by a contacting indicator on the balance arm. The balance arm and lens assembly would then be removed and the mirror and linear guide member installed on the socket component of the ball and socket joint 12a.

FIG. 19 is a diagram which is helpful in understanding the conditions under which interferences might arise between components of the collector. In FIG. 19, the parallel arms 28, which are of length L, are pointed toward the sun at an angle $\theta_m$ from the axis of the collector, where $\theta_m$ is assumed to be the maximum angle at which the sun can be tracked by the collector. As it is known that a mirror mount joint and the associated positional guide both reside on the same spherical surface of radius L, it follows that the maximum distance between them will be 2L, which is then an appropriate length for the linear guide members 18. Initially assuming the mirrors to be round, an appropriate mirror radius would also be roughly L, and to avoid obvious interference between mirrors, the typical spacing D between mirror mounts would then have to be at least 2L. Inspection of FIG. 19 shows that out to a rim angle of about 45 degrees, the mirrors of radius L should not interfere with any other components. However, beyond a 45 degree rim angle, it becomes necessary to reduce the size of the mirrors to eliminate interferences. At a radius R from the axis of the collector, the maximum angle that a linear guide member will be required to make, measured from the axis direction, will be $\frac{1}{2}(\theta_m + \pi/2 - \tan^{-1}h/R)$ where $h$ is the height of the radiation receiver above the mirrors, measured along the axis direction. A reasonably accurate expression for the maximum radius that the mirror at distance R from the axis of the collector can have without danger of interference with the linear guide members of adjacent mirrors is $D\cos\frac{1}{2}(\theta_m + \pi/2 - \tan^{-1}h/R)$. The maximum packing density for round mirrors is achieved if adjacent mirror mounts are positioned generally at the vertices of equilateral triangles, with the distance D then being the length of a side of a triangle.

If square mirrors are used in a square pattern, the interference considerations are somewhat more complex. However, it appears that if the combination of linear guide member and positional guide for each mirror forms an angular coupling to keep the square mirror in a defined angular position about the linear guide member, and if the fixed axis of each positional guide is parallel to one of the lattice directions of the square pattern, and if further the sides of the square mirrors are made parallel to the lattice directions when the linear guide member for the mirror is parallel to the axis of the collector, then the same expression used above to specify that a round mirror not interfere with an adjacent linear guide member may also be applied to the square mirrors. If the distance D is between nearest neighbor mirror mounts in the square pattern, the dimension of the square mirror which must not be larger than the expression given above is half the length of a mirror edge. If the distance D is the diagonal spacing between mirror mounts, the dimension of the mirror referred to would be half the mirror diagonal. It should be noted, however, that for the square mirror pattern using square mirrors, the appropriate length L for the parallel arms is roughly half of the diagonal distance between mirror mounts rather than half the distance between nearest neighbor mirror mounts. If the shorter length parallel arms were used, there would be the possibility that the mirror diagonals would interfere directly with the lattice 24 before interference occurred with the linear guide members 18.

Various modes of carrying out the invention are contemplated as being within the scope of the following claims particularly pointing out and distinctly claiming the subject matter which is regarded as the invention.

I claim:

1. A solar radiation collector utilizing mechanically linked mirrors to provide radiation concentration, comprising:
   (a) a radiation receiver,
   (b) a first rigid structure substantially greater in dimensional extent in at least one dimension than the dimentions of the radiation receiver, the first rigid structure being generally fixed with respect to the radiation receiver at a position displaced from the radiation receiver along a line normal to the directions of major dimensional extent of the first rigid structure,
   (c) a first plurality of articulated joints carried by the first rigid structure, the joints allowing free rotation in any direction within a substantial range of angular positions,
   (d) a plurality of mirrors, each mirror being coupled to and rotatable about an individual joint of the first plurality of articulated joints so that, when properly oriented, each of the mirrors may reflect radiation from a radiation source onto the radiation receiver,
   (e) a second rigid structure which is translatably movable in three mutually perpendicular directions with respect to the first rigid structure, with the motion being constrained so that each point on the second rigid structure generally moves over a spherical surface particular to that point,
   (f) a plurality of positional guides carried by the second rigid structure, each individual positional guide being paired with an individual joint of the first plurality of articulated joints in that each positional guide is disposed with respect to the second rigid structure in such a way that the particular spherical surface to which a positional guide is constrained contains an articulated joint of the first plurality of joints, with the articulated joint positioned at the intersection with the spherical surface of a straight line which passes through the position of the radiation receiver and the center of the particular sphere of constraint,
   (g) a plurality of linear guide members, each coupled to an individual articulated joint of the first plurality of joints and extending to the positional guide associated with that particular joint, with the positional guide slidably engaging the linear guide member and with each linear guide member adapted to orient the individual mirror associated with that particular joint to a position normal to the linear guide member, and
   (h) means for moving the second rigid structure, in response to changes in the angular position of the sun, so that each positional guide lies along a line which passes through the center of the particular sphere of constraint for that positional guide and is aligned in the direction of the sun.

2. The radiation collector of claim 1, wherein:
   (a) the first plurality of articulated joints is distributed over a segment of a first generally smooth surface of revolution which is fixed with respect to the first rigid structure, with the axis of revolution being a line passing through the radiation receiver, and
   (b) the plurality of positional guides is distributed over a segment of a second generally smooth surface of revolution which is fixed with respect to the second rigid structure, with the axis of revolution being parallel to the axis of revolution for the first surface of revolution and further being coincident with the axis of revolution for the first surface of revolution when the second rigid structure is in a position appropriate for focusing radiation from a source lying along the axes of revolution, and with the further detailed relationship between the surfaces of revolution being as recited in the specification.

3. The radiation collector of claim 2, wherein the second surface of revolution is a plane surface.

4. The radiation collector of claim 2, wherein the first surface of revolution is a plane surface.

5. The radiation collector of claim 1, further comprising:
   (a) a second plurality of articulated joints carried by the first rigid structure, with each joint providing a first pivotal motion about a common first axis direction and a second pivotal motion about a second axis direction which is orthogonal to the first axis direction and which is rotatable about the first axis direction,
   (b) a third plurality of articulated joints, carried by the second rigid structure, with each joint of the third plurality of joints being paired with a corresponding joint in the second plurality of joints, and with the spatial relationship among the third plurality of joints being identical to the spatial relationship among the second plurality of joints, and
   (c) a plurality of equal length parallel arms, each arm articulatably linking an articulated joint of the second plurality of joints with the corresponding joint of the third plurality of joints.

6. The radiation collector of claim 5, wherein the means for moving the second rigid structure comprises a first rotary actuator acting about the first axis direction and a second rotary actuator acting about the second axis direction on at least one articulated joint of the second plurality of joints, with the first and second rotary actuators controlled by sun sensing means fixed to one of the parallel arms so that the parallel arms are kept continually aligned parallel to the direction of incoming sunlight.

7. The radiation collector of claim 5, wherein at least two joints of the second plurality of joints are colinear along the common first axis direction.

8. The radiation collector of claim 7, further comprising at least one rotatable shaft rigidly linking at least two colinear joints of the second plurality of joints along their common first axis direction in such a manner that the second axis directions are rigidly held common for the colinear joints so linked.

9. The radiation collector of claim 6, wherein:
   (a) the first rigid structure is comprised of the local earth surface over which the collector is disposed,
   (b) the second rigid structure is comprised of rigid steel members,
   (c) the second rigid structure is constructed in sections, with individual sections linked by expansion joints adapted to tranfer generally vertical forces between sections while limiting the displacement due to thermal expansion within the second rigid structure to the expansion associated with each individual section, and
   (d) each individual section of the second rigid structure is provided individual motional means, with the motional means for each section moving that section in identical fashion to every other section, whereby the second rigid structure as a whole retains substantially greater dimensional stability under changing ambient temperature than would be possible for a non-sectioned steel structure.

10. The radiation collector of claim 5, wherein the common first axis direction of the second plurality of articulated joints is contained in a vertical plane oriented in the north-south direction.

11. The radiation collector of claim 1, further comprising a plurality of mounting posts, each having a first end fixed to the first rigid structure and a second end carrying an articulated joint of the first plurality of joints.

12. The radiation collector of claim 11, wherein the articulated joints of the first plurality of joints are ball and socket joints.

13. The radiation collector of claim 12, wherein the individual mounting posts comprise a straight portion and a bent portion, the bent portion being located in the region of the second end of each mounting post and being shaped in such a way that the center of rotation of the ball and socket joint carried by that post is in line with an extension of the straight portion of the post, while in the region of attachment of the ball and socket joint to the second end of the mounting post the bent portion of the post makes an angle of up to 35° with respect to an extension of the straight portion of the post.

14. The radiation collector of claim 1, wherein:
   (a) the first rigid structure comprises a plurality of linear elements arranged in a rectangular lattice, whereby there are a plurality of points of intersection between orthogonally disposed linear elements,
   (b) each articulated joint of the first plurality of joints comprises:
      (1) a ball centered at a point of intersection between the orthogonal linear elements of the lattice, and
      (2) a segmented socket having four narrow segments adapted for gripping the ball without interfering with the linear elements of the first rigid structure lattice,
   (c) each mirror is segmented, with each individual segment carried by an individual segment of the socket portion of the particular ball and socket joint with which the mirror associated, and with the individual mirror segments separated sufficiently to provide clearance for the linear elements comprising the first rigid structure as the mirror is moved through a range of angular positions, and
   (d) each positional guide of the plurality of positional guides comprises an angular coupling adapted to maintain the associated linear guide member in a defined rotational position about an axis coincident with the linear guide member, with each positional guide having a fixed pivot axis parallel to one of the orthogonal directions of orientation of the linear elements comprising the first rigid structure.

15. The radiation collector of claim 2, further comprising:
   (a) a first layer of thin durable material containing a first plurality of spaced small holes,
   (b) a second layer of thin durable material containing a second plurality of spaced small holes, the second layer of material being spaced from the first layer of material, wherein:
      (1) the first rigid structure comprises a shaping framework which holds the first layer of material in the form of the first surface of revolution of claim 2,
      (2) the second rigid structure comprises a shaping framework which holds the second layer of material in the form of the second surface of revolution of claim 2, (3) the individual holes of the second plurality of holes in the second layer of material are paired with the individual holes of the first plurality of holes in the first layer of material, and the position of each individual hole in the second layer of material is spatially related to the position of an associated hole in the first layer of material according to the prescription recited in the specification for the spatial relationship between a positional guide and an associated articulated joint of the first plurality of joints, (4) each linear member of the plurality of linear guide members is comprised of a pin having a thickened region along its length, the thickened region functionally dividing each pin into a generally shorter portion and a generally longer portion, (5) the longer portion of each pin is inserted through an associated pair of holes in the first and second layers of thin durable material, with the thickened region of the pin serving as a stop to allow the pin to be supported by the uppermost layer of thin durable material, and (6) the plurality of mirrors, each having a diameter generally comparable to the length of the shorter portion of a pin and generally less than the dimensions of the radiation receiver, are attached to the free ends of the shorter portion of the pins.

16. The radiation collector of claim 1, wherein the plurality of mirrors includes mirrors of differing size, with the mirrors in closest proximity to the radiation receiver being relatively larger in size and the mirrors at the greatest distance from the radiation receiver being relatively smaller in size.

17. The radiation collector of claim 1, further comprising a transparent covering disposed between the plurality of mirrors and the radiation receiver.

18. The radiation collector of claim 17, further comprising:
(a) a large area radiation absorber disposed on the opposite side of mirrors from the radiation receiver, and
(b) means for transporting thermal energy from the large area radiation absorber to a use region.

19. The radiation collector of claim 18, wherein:
(a) the second rigid structure comprises:
(1) a peripheral frame,
(2) narrow structure sections, each slidably engaging the peripheral frame,
(b) each mirror of the plurality of mirrors is made reflective on both its front and back surfaces, and
(c) the collector further comprises means for varying the spacing of the individual structure sections comprising the second rigid structure between a first spacing, in which the positional guides are in suitable position to produce simultaneous focusing alignment of all the mirrors, and a second spacing, which allows all the mirrors to be tilted simultaneously to angles generally in excess of 60 degrees with respect to the plane of the collector.

* * * * *